United States Patent
Jung et al.

(10) Patent No.: US 7,640,102 B2
(45) Date of Patent: Dec. 29, 2009

(54) SELF-TUNING APPARATUS OF VEHICLE SPEED PULSE COEFFICIENT AND METHOD THEREOF

(75) Inventors: Mun Ho Jung, Gyeonggi-do (KR); Dong Hoon Yi, Seoul (KR)

(73) Assignee: LG Electronics, Inc., Seoul (KR)

( * ) Notice: Subject to any disclaimer, the term of this patent is extended or adjusted under 35 U.S.C. 154(b) by 380 days.

(21) Appl. No.: 11/191,668

(22) Filed: Jul. 27, 2005

(65) Prior Publication Data
US 2006/0025921 A1 Feb. 2, 2006

(30) Foreign Application Priority Data
Jul. 29, 2004 (KR) ........................ 10-2004-0059818

(51) Int. Cl.
G01C 21/00 (2006.01)
G06F 17/00 (2006.01)

(52) U.S. Cl. ............................ 701/213; 701/1; 701/200; 701/214; 701/215; 701/216; 701/217; 342/357.06; 342/357.08; 342/357.12; 342/357.13; 342/357.14

(58) Field of Classification Search ...................... 701/1, 701/200, 213–217; 342/357.06, 357.08, 342/357.12–357.14
See application file for complete search history.

(56) References Cited

U.S. PATENT DOCUMENTS

| | | | | |
|---|---|---|---|---|
| 4,903,212 A | * | 2/1990 | Yokouchi et al. | 701/216 |
| 5,276,451 A | * | 1/1994 | Odagawa | 342/357.03 |
| 5,293,318 A | * | 3/1994 | Fukushima | 701/216 |
| 5,307,277 A | * | 4/1994 | Hirano | 701/207 |
| 5,323,163 A | | 6/1994 | Maki | |
| 5,479,811 A | * | 1/1996 | Baumann et al. | 73/1.37 |
| 5,483,457 A | * | 1/1996 | Shibata et al. | 701/221 |
| 5,686,925 A | * | 11/1997 | Maeda et al. | 342/357.05 |
| 5,808,581 A | | 9/1998 | Braisted et al. | |

(Continued)

FOREIGN PATENT DOCUMENTS

JP 5209756 * 8/1993

(Continued)

Primary Examiner—Jack W. Keith
Assistant Examiner—Chuong P Nguyen
(74) Attorney, Agent, or Firm—Lee, Hong, Degerman, Kang & Waimey

(57) ABSTRACT

A self-tuning apparatus of vehicle speed pulse coefficient and a method thereof wherein a vehicle speed pulse coefficient is flexibly adjusted by environments in which a mobile object travels and a current status of the mobile object to thereby enable to precisely calculate a travel distance and a travel speed of the mobile object in response to a vehicle speed pulse signal. A tuning start signal is generated when a value of DOP (Dilution of Precision) and travel status of the mobile object meet a condition for tuning a vehicle speed pulse coefficient value, and the vehicle speed pulse coefficient value is calculated by a travel speed pulse coefficient tuning unit using a travel distance of the mobile object discriminated by a discriminating unit and the number of vehicle speed pulse signals counted by a travel speed pulse signal counting unit during an established period of time when a tuning start signal is kept being generated during the established period of time, and the pre-established travel speed pulse coefficient value is tuned by the calculated vehicle speed pulse coefficient value.

8 Claims, 3 Drawing Sheets

U.S. PATENT DOCUMENTS

| | | | |
|---|---|---|---|
| 5,828,585 A * | 10/1998 | Welk et al. | 702/96 |
| 5,890,092 A * | 3/1999 | Kato et al. | 701/216 |
| 7,096,116 B2 * | 8/2006 | Tanaka et al. | 701/200 |
| 2002/0128775 A1 * | 9/2002 | Brodie et al. | 701/216 |
| 2003/0236607 A1 * | 12/2003 | Tanaka et al. | 701/70 |
| 2005/0021229 A1 * | 1/2005 | Lee et al. | 701/210 |

FOREIGN PATENT DOCUMENTS

| | | |
|---|---|---|
| JP | 7260502 * | 10/1995 |
| JP | 07260502 | 10/1995 |
| JP | 8304089 * | 11/1996 |
| JP | 11304507 * | 11/1999 |
| KR | 1020030072521 A | 9/2003 |
| WO | 98125107 A2 | 6/1998 |

* cited by examiner

SELF-TUNING APPARATUS OF VEHICLE SPEED PULSE COEFFICIENT AND METHOD THEREOF

CROSS-REFERENCE TO RELATED APPLICATIONS

Pursuant to 35 U.S.C. § 119(a), this application claims the benefit of earlier filing date and right of priority to Korean Application No. 2004-0059818, filed on Jul. 29, 2004, the contents of which are hereby incorporated by reference herein in their entirety.

BACKGROUND OF THE INVENTION

1. Field of the Invention

The present invention relates to a self-tuning apparatus of vehicle speed pulse coefficient and a method thereof configured to self-tune a value of vehicle speed pulse coefficient converting the number of vehicle pulse signals generated in the course of a traveling mobile object to a traveling distance and a traveling speed.

2. Description of the Related Art

Generally, driving wheels of a mobile object are equipped with vehicle speed sensors such as differential odometers and the like. The differential odometer generates a number of vehicle speed pulse signals in proportion to a traveling distance of a mobile object, such that multiplication of the number of vehicle speed pulse signals generated by the vehicle speed sensor with vehicle speed pulse coefficients can compute a traveled distance of the mobile object.

Furthermore, when the number of vehicle speed pulse signals generated for each unit time by a vehicle speed sensor is counted, the number of vehicle speed pulse signals counted per unit time multiplied by the vehicle speed pulse coefficients can compute a traveling speed of a mobile object.

Even if a mobile object travels a predetermined distance, the number of vehicle speed pulse signals generated by a vehicle speed sensor is not the same. For example, frictions between vehicle wheels and roads are differently generated in relation to a case where a mobile object travels on a high way and a road, and a traveling speed of the mobile object. Furthermore, frictions generated between vehicle wheels and roads differ when a vehicle travels on a road on a rainy or snowy situation. Even if a mobile object travels a same distance, the number of generated vehicle speed pulse signals differ due to differently generated frictions. Meanwhile, there are generated frictions on the vehicle wheels according as a mobile object travels, and the number of vehicle speed pulse signals are differently generated in response to the amount of generated abrasion.

Preferably, a vehicle speed pulse coefficient value is flexibly adjusted in response to road environments and the state of a mobile object including frictions generated between the vehicle wheels and a road and an abraded state of vehicle wheels, and the like.

The vehicle speed pulse coefficient is generally fixed beforehand at a predetermined value when a mobile object is outputted from a motor factory. The vehicle speed pulse coefficient value may be periodically tuned at a maintenance shop of a mobile object. However, the afore-mentioned vehicle speed pulse coefficient is tuned at a value under a predetermined tuning environment, such that it was not flexibly tuned in response to spontaneously variable road environment changes and current state of a mobile object as the mobile object travels along. As a result, there have occurred lots of errors when the traveling distance and traveling speed are computed by the number of the vehicle speed pulse signals.

Generally, a navigation system is such that at least four or more navigation messages are received by a Global Positioning System (GPS) receiver out of navigation messages periodically transmitted by a plurality of GPS satellites arranged on geostationary orbits over the Earth to detect 3D location coordinates. The location coordinates detected by the GPS receiver are determined as a current location of a mobile object, and the detected current location of the mobile object is map-matched on a digital map so that the digital map and the location of the mobile object can be displayed on a display screen.

In a navigation system using GPS, the current location of the mobile object detected by the received navigation messages can be accurately detected only at an area where the GPS receiver can precisely receive the navigation messages, and the current location of the mobile object cannot be accurately detected at an area where the navigation messages cannot be precisely received. In other words, in the navigation system using the GPS, navigation messages transmitted by the plurality of GPS satellites are received by a GPS receiver to detect the location of a mobile object. Therefore, the receiver may not detect coordinates of a vehicle location or merely can obtain very incorrect results of detection of the coordinates at areas, including the interiors of tunnels thickly-wooded forests or downtown areas surrounded by skyscrapers, where the GPS receiver cannot correctly receive the navigation messages transmitted by the GPS satellites due to the cutoff of GPS signals. Worse yet, the GPS receiver can produce a geometrical error in response to received locations of the navigation messages from the GPS satellites transmitting the navigation messages used for detecting the location coordinates.

The GPS receiver also calculates a Dilution of Precision (DOP) value for discriminating credibility relative to the detected location of the coordinates when the location coordinates are detected by the navigation messages. The DOP value comes to have a lower value as the credibility of location coordinates detected by the navigation messages gets higher, and the navigation system compares with a threshold predetermined by the DOP value to discriminate whether to use the credibility of the location coordinates.

If the DOP value is less than the predetermined threshold, the navigation system discriminates that the location coordinates detected by the navigation messages received by the GPS receiver is credible, and the location coordinates detected by the GPS receiver are determined as a current location of a mobile object.

Furthermore, if the DOP value is not less than the predetermined threshold, the location coordinates detected by the navigation messages are discriminated as discreditable, and the location coordinates detected by the GPS receiver are not used. Instead, the mobile object detects the current location using signals detected by sensors mounted at the mobile object.

A mobile object is mounted with vehicle sensors generating vehicle speed pulse signals in response to rotations of the driving wheels, gyroscopes detecting travel angle variations of the mobile object, and gradient sensors detecting horizontal and vertical gradients of a road on which a mobile object travels. The navigation system uses signals detected by the vehicle sensors, gyroscopes and gradient sensors mounted on a vehicle to measure travel distances and travel directions of the mobile object, which in turn estimate the location of the mobile object.

However, in the prior art thus explained, a vehicle speed pulse coefficient value is not tuned in response to road environments and current state of a mobile object, and instead fixed by any one value thereof such that lots of errors occur with regard to calculated travel distances if the number of vehicle speed pulse signals produced by the vehicle sensors in response to the traveling of the mobile object are calculated as travel distances of the mobile object.

As a result, there is a problem in the prior art thus described in that in case a DOP value is equal to or greater than the threshold in the navigation system, and signals detected by the sensors are used for detecting a current location of a mobile object, a precise location of the mobile object cannot be map-matched, and instead map-matched to a different location to thereby decrease the credibility of the navigation system.

SUMMARY OF THE INVENTION

The present invention is disclosed to solve the aforementioned problems and it is an object of the invention to provide a self-tuning apparatus of vehicle speed pulse coefficient and a method thereof adapted to tune a vehicle speed pulse coefficient in response to road environments in which a mobile object travels and current state of the mobile object and to precisely calculate a traveling distance and traveling speed by the number of vehicle speed pulse signals.

It is another object of the present invention to provide a self-tuning apparatus of vehicle speed pulse coefficient and a method thereof adapted to precisely calculate a traveling distance of a mobile object by a vehicle speed pulse signal produced by vehicle sensors in a navigation system to thereby enable to precisely map-match a location of the mobile object on a map data so that the digital map and the vehicle location can be accurately displayed on a display screen.

In accordance with one aspect of the present invention, there is provided a self-tuning apparatus of vehicle speed pulse coefficient, the apparatus comprising: tuning condition discriminating means discriminating whether to satisfy a condition for tuning a vehicle speed pulse coefficient value; travel distance discriminating means discriminating a traveled distance of a mobile object when it is discriminated that the tuning condition discriminating means satisfies the tuning condition; vehicle speed pulse signal counting means counting a vehicle speed pulse signal produced by the traveling of the mobile object when it is discriminated that the tuning condition discriminating means satisfies the tuning condition; and vehicle speed pulse coefficient tuning means calculating a vehicle speed pulse coefficient value by a travel distance of a mobile object discriminated by the travel distance discriminating means during a predetermined period and by the number of the vehicle speed pulse signal counted by the vehicle speed pulse counting means, and tuning the pre-established vehicle speed pulse coefficient value by the calculated vehicle speed pulse coefficient value.

In accordance with another aspect of the present invention, there is provided a self-tuning method of vehicle speed pulse coefficient, the method comprising the steps of: discriminating whether a tuning condition of the vehicle speed pulse coefficient value is satisfied; discriminating the travel distance of a mobile object if it is discriminated that the tuning condition is satisfied, and counting the number of vehicle speed pulse signals produced in proportion to the travel distance of the mobile object; calculating the vehicle speed pulse coefficient value by the travel distance of the mobile object and the counted number of the vehicle speed pulse signals; and tuning a predetermined vehicle speed pulse coefficient value by the calculated vehicle speed pulse coefficient value.

DETAILED DESCRIPTION OF THE INVENTION

Now, preferred embodiments of the present invention will be described in detail with reference to the annexed drawings.

Figure 1:
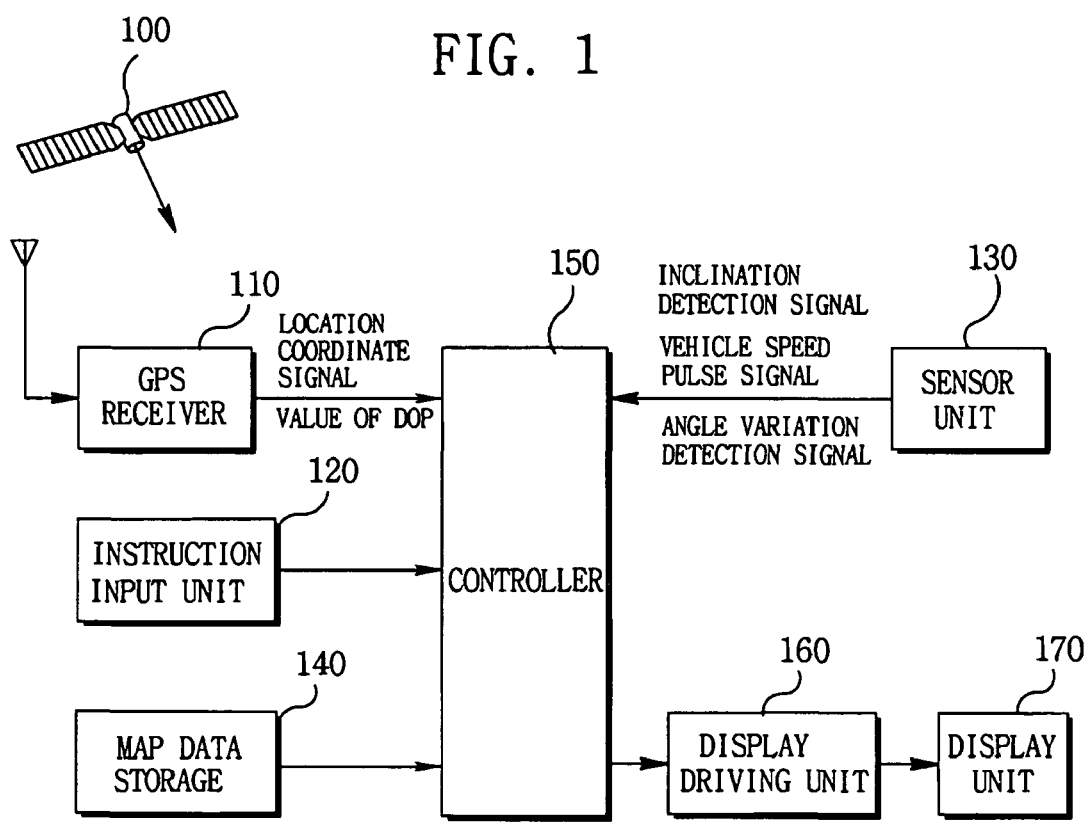
FIG. 1 is a schematic block diagram showing a structure of a navigation system to which a self-tuning apparatus is applied according to the present invention.

FIG. 1 is a schematic block diagram showing a structure of a navigation system to which a self-tuning apparatus is applied according to the present invention.

Reference numeral 100 denotes a plurality of GPS satellites arranged on geostationary orbits over the Earth for periodically transmitting navigation messages, and reference numeral 110 denotes a GPS receiver. The GPS receiver (110) receives navigation messages transmitted by at least four GPS satellites among the navigation messages transmitted by the plurality of GPS satellites, so as to detect 3D coordinates and calculate the value of DOP with respect to the received navigation messages.

Reference numeral 120 denotes an instruction input unit manipulated by a user. The instruction input unit (120) inputs various operational instructions the navigation system is to conduct in response to the manipulation of the user. The instruction input unit (120) may also input a self-tuning instruction of the vehicle speed pulse coefficient.

Reference numeral 130 denotes a sensor unit for detecting a travel state of a mobile object. The sensor unit (130) is equipped with, for example, an vehicle speed sensor, a gyroscope, an angle sensor and the like. When a mobile object moves, the vehicle speed sensor produces a vehicle speed pulse signal. The angle sensor detects a horizontal (left/right) inclination and a vertical (up/down) inclination of a road on which a vehicle travels to generate an inclination detection signal. The gyroscope generates a travel angle variation detection signal of a mobile object in response to changes of travel direction of a vehicle.

Reference numeral 140 denotes a map data storage in which a map data is stored beforehand for the navigation system searching a travel route of a mobile object and for guiding the traveling.

Reference numeral 150 denotes a controller. The controller (150) serves to control the entire operation of the navigation system in response to a user's instruction inputted from the instruction input unit (120). The controller (150) uses a detection signal from the GPS receiver (110) and the sensor unit (130) to detect the current location of a mobile object when the mobile object travels, matches the detected current location of the mobile object and controls the display of the matched map data and the current location of the mobile object.

The controller (150) also discriminates whether to satisfy a condition of tuning a vehicle speed pulse coefficient value by the value of DOP outputted by the GPS receiver (110), and the inclination detection signal and travel angle variation detection signal outputted by the sensor unit (130) when there occurs a tuning instruction of vehicle speed pulse coefficient, and if it is discriminated that the mobile object can satisfy the condition for tuning the vehicle speed pulse coefficient value, the mobile object uses the travel distance and the number of vehicle speed pulse signals generated by the sensor unit (130) to tune the vehicle speed pulse coefficient value.

Reference numeral 160 denotes a display driving unit. The display driving unit (160) displays on a display unit (170) a map data in response to the control of the controller (150) and the current location of the mobile object matched to the map data.

In the navigation system thus constructed, the GPS receiver (110) receives navigation messages transmitted by at least four GPS satellites among the navigation messages transmitted by the plurality of GPS satellites, so as to detect 3D coordinates and calculate the value of DOP with respect to the received navigation messages for output to the controller (150).

When a mobile object moves, the sensor unit (130) detects a travel angle variation of the mobile object, and horizontal (left/right) and vertical (up/down) inclinations of a road on which a vehicle travels, and outputs travel angle variation detection signal and inclination detection signal to the controller (150). The sensor unit (130) also detects a vehicle speed pulse signal in response to the travel distance of the mobile object and outputs to the controller (150).

The controller (150) discriminates whether the value of DOP outputted by the GPS receiver (110) is less than a predetermined threshold, and as a result of the discrimination, if it is discriminated that the value of DOP is less than the threshold, a position coordinate outputted by the GPS receiver (110) is determined as the current location of the mobile object, and the determined current location of the mobile object is matched to the map data stored in the storage (140), outputted to the display driving unit (160) and displayed on the display (170).

If the value of the DOP outputted by the GPS receiver (110) is not less than the predetermined threshold, the controller (150) discriminates the travel angle variation outputted by the sensor unit (130) and horizontal and vertical inclinations of a road on which the mobile object travels. Furthermore, the controller (150) calculates a travel distance of the mobile object by multiplying the vehicle speed pulse coefficient by the number of the vehicle speed pulse signals outputted by the sensor unit (130). The calculated travel distance of the mobile object is corrected by the discriminated horizontal and vertical inclinations of the road, and the current location of the mobile object is estimated by the corrected travel distance and the travel angle variation of the mobile object. The estimated current location of the mobile object is matched with the map data stored in the map data storage (140), outputted to the display driving unit (160) and displayed on the display unit (170).

Under these circumstances, the controller (150) discriminates whether tuning instruction of the vehicle speed pulse coefficient has occurred.

The tuning instruction of the vehicle speed pulse coefficient may be inputted by a user manipulating the instruction input unit (120). Furthermore, the tuning instruction of the vehicle speed pulse coefficient may be automatically generated when the travel speed variation of a mobile object is equal or greater than a predetermined speed, or may be automatically generated when environment changes including snowing, raining and the like on a road on which the mobile object travels are detected by a humidity sensor (not shown) separately mounted on the mobile object. The tuning instruction may be also automatically generated when the kind of a road on which a mobile object travels changes, that is, when a mobile object changes to run on a highway while traveling on a road.

When the tuning instruction of the vehicle speed pulse coefficient is generated, the controller (150) uses the value of the DOP outputted by the GPS receiver (110), the inclination detection signal outputted by the sensor unit (130) and the travel angle variation detection signal, to discriminate whether the condition for tuning the vehicle speed pulse coefficient can be met. As a result of the discrimination, if the condition for tuning the vehicle speed pulse coefficient can be met, the number of vehicle speed pulse signals is counted during a predetermined period of time. While the counted number of vehicle speed pulse signals and the number of vehicle speed pulse signals are counted, the mobile object uses the covered travel distance to calculate the vehicle speed pulse coefficient value and conduct the tuning.

Figure 2:
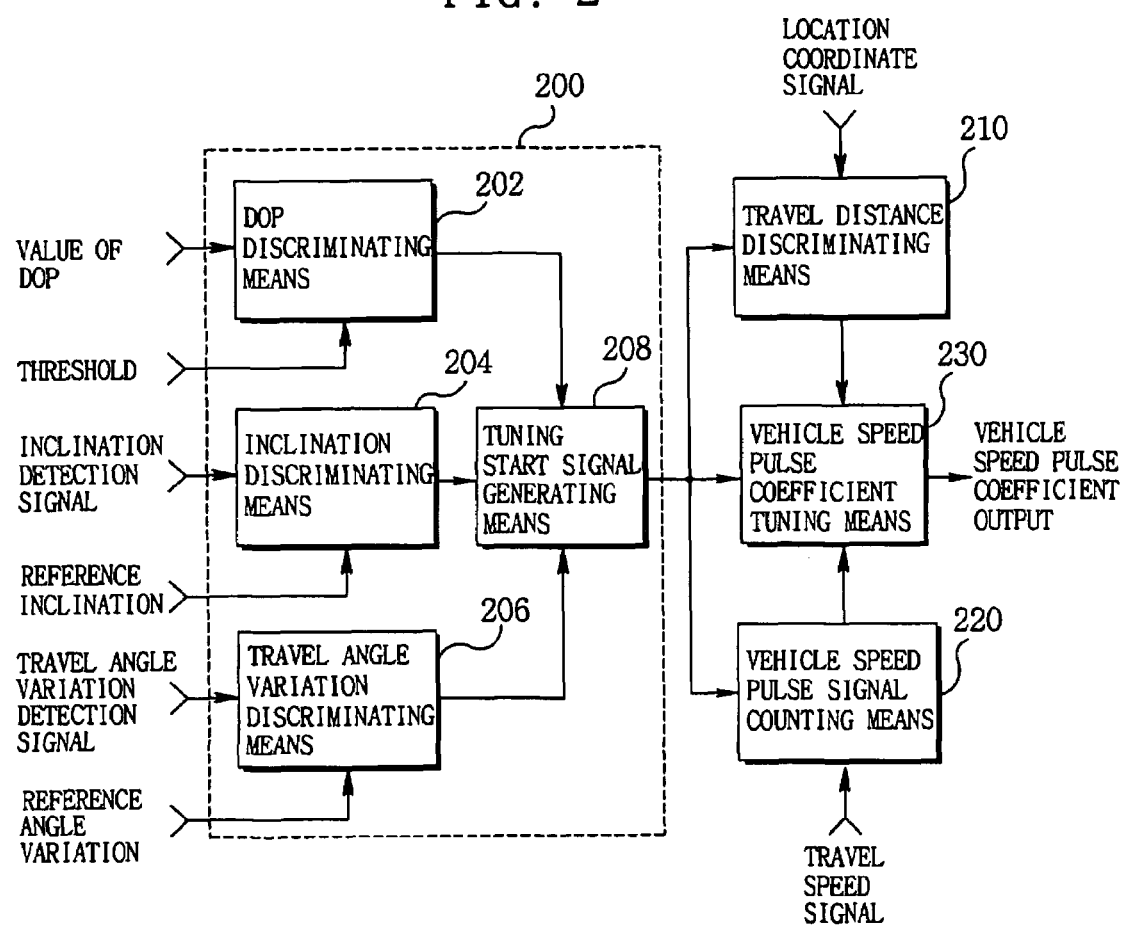
FIG. 2 is a schematic block diagram showing an inner structure of a controller in a self-tuning apparatus according to the present invention.

FIG. 2 is a schematic block diagram showing an inner structure of a controller (150) in a self-tuning apparatus according to the present invention. Reference numeral 200 denotes tuning condition discriminated means for discriminating whether a tuning condition of the vehicle speed pulse coefficient is met. The tuning condition discriminating means (200) includes DOP discriminating means (202), inclination discriminating means (204), angle variation discriminating means (206) and tuning start signal generating means (208).

The DOP discriminating means (202) discriminates whether the value of the DOP outputted by the GPS receiver (110) is less than the predetermined threshold, and outputs a signal generated by the result of the discrimination. For example, if the value of the DOP is less than the threshold, a signal of logic '1' is outputted.

The angle variation discriminating means (206) discriminates whether the travel angle variation detection signal outputted by the sensor unit (130) is less than the predetermined reference angle variation, and outputs a signal generated by the result of the discrimination. For example, if the travel angle variation detection signal outputted by the sensor unit (130) is less than the reference angle variation, a signal of logic '1' is outputted.

The tuning start signal generating means (208) discriminates whether a condition can be satisfied, the condition being that the vehicle speed pulse coefficient value can be tuned by output signals from the DOP discriminating means (202), the inclination discriminating means (204) and the angle variation discriminating means (206). As a result of the discrimination, if the tuning condition of vehicle speed pulse coefficient value can be satisfied, the tuning start signal generating means (208) generates a tuning start signal.

In other words, the tuning start signal generating means (208) generates a tuning start signal heralding the tuning start, if the DOP discriminating means (202) discriminates that the value of the DOP outputted by the GSP receiver (110) is less than a predetermined threshold, the inclination discriminating means (204) discriminates that the horizontal and vertical inclination detection signal is less than a predetermined reference inclination, and the angle variation discriminating means (206) discriminates that the travel angle variation detection signal is less than a predetermined reference angle variation.

The tuning start signal generated by the tuning start signal generating means (208) is inputted to travel distance discriminating means (210), vehicle speed pulse signal counting means (220) and vehicle speed pulse coefficient tuning means (230) respectively.

The travel distance discriminating means (210) stores a location coordinate signal outputted by the GPS receiver (110) when tuning start signal generating means (208) generates a tuning start signal. A distance covered by a mobile object from an initial stage of the tuning start signal being generated is continuously calculated from the stored location coordinate signal by using the location coordinate signal outputted by the GPS receiver (110), and the distance is outputted to the vehicle speed pulse coefficient tuning means (230).

The vehicle speed pulse signal counting means (220) counts the number of the vehicle speed pulse signal outputted from the sensor unit (130) from at a time the tuning start signal generating means (208) generates the tuning start signal, and outputs the counted value to the vehicle speed pulse coefficient tuning means (230).

The vehicle speed pulse coefficient tuning means (230) drives a timer (not shown) when the tuning start signal generating means (208) generates a tuning start signal and counts a lapse time. Furthermore, when the tuning start signal generating means (208) keeps generating the tuning start signal until the timer counts a predetermined period of time, a travel distance of a mobile object discriminated by the travel distance generating means (220) during the predetermined period of time and the number of vehicle speed pulse signals counted by the vehicle speed pulse signal counting means (220) are inputted, and the vehicle speed pulse coefficient value is calculated using the inputted travel distance of the mobile object and the number of the vehicle speed pulse signals, and the calculated vehicle speed pulse coefficient value is outputted.

The vehicle speed pulse coefficient value is calculated, for example, by the following Equation 1.

$$Vc = D/N \qquad \text{Equation 1:}$$

Where, Vc denotes the calculated vehicle speed pulse coefficient value, D denotes a distance of a mobile object discriminated by the travel distance discriminating means (210), N denotes the number of counted vehicle speed pulse signals counted by the vehicle speed pulse signal counting means (220).

Figure 3:
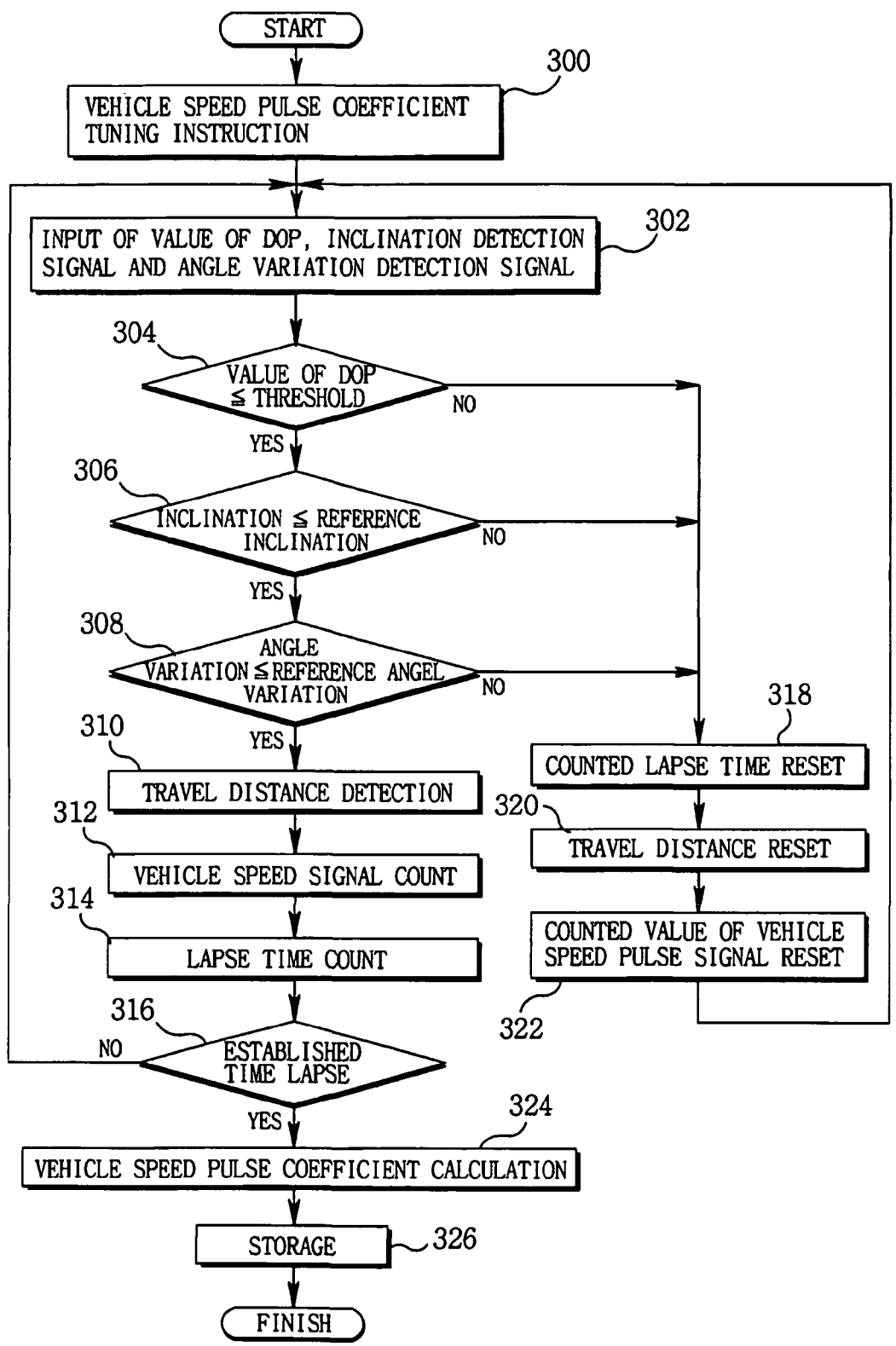
FIG. 3 is a signal flow chart showing a self-tuning method according to the present invention.

Once the vehicle speed pulse coefficient value is thus calculated, the predetermined vehicle speed pulse coefficient value is tuned by the calculated vehicle speed pulse coefficient value so that the travel distance and the travel speed of the mobile object can be calculated by the tuned vehicle speed pulse coefficient value Meanwhile, FIG. 3 is a signal flow chart showing a self-tuning method according to the present invention.

Referring to FIG. 3, the controller (150) discriminates whether a tuning instruction of the vehicle speed pulse coefficient has been generated (S300). The tuning instruction of the vehicle speed pulse coefficient can be given by a user via the instruction input unit (120) as mentioned earlier. Furthermore, if the travel speed of a mobile object is equal to or greater than the predetermined speed, or surrounding environments of the mobile object have changed, or the kind of road on which the mobile object has changed, the tuning instruction of the vehicle speed pulse coefficient can be generated.

When the tuning instruction of the vehicle speed pulse coefficient is generated, the tuning condition discriminating means (200) inputs the value of the DOP outputted by the GPS receiver (110), the inclination detection signal, the travel angle detection signal outputted by the sensor unit (130) and the travel angle variation detection signal. (S302).

Successively, the DOP discriminating means (202) of the tuning condition discriminating means (200) discriminates whether the DOP value outputted by the GPS receiver (110) is less than the predetermined threshold (S304). The inclination discriminating means (204) of the tuning condition discriminating means (200) discriminates whether the horizontal and vertical inclinations outputted by the sensor unit (130) are less than the predetermined reference inclination (S306). The angle variation discriminating means (206) discriminates whether the travel angle variation detected by the sensor unit (130) is less than the predetermined reference angle variation (S308).

As a result of the discrimination, if the value of DOP is less than the threshold, the inclination is less than the reference inclination, and travel angle variation is less than the reference angle variation, the tuning start signal generating means (208), assuming that the tuning condition of the vehicle speed pulse coefficient value is met, generates a tuning start signal.

The travel distance discriminating means (210) uses the location coordinates outputted by the GPS receiver (110) to discriminate the travel distance of the mobile object in response to the generated tuning start signal (S310). The vehicle speed pulse signal counting means (220) counts the number of vehicle speed pulse signals outputted by the sensor unit (130) (S312). The vehicle speed pulse coefficient tuning means (230) counts the lapse time following the generation of the tuning start signal (S314).

The vehicle speed pulse signal coefficient tuning means (230) discriminates whether the counting of the predetermined period of time has been completed (S316).

As a result of the discrimination, if the counting of the predetermined period of time has not been completed, flow returns to S302 to discriminate the travel distance of the mobile object, if the value of DOP is less than the threshold, inclination is less than the reference inclination and travel angle variation is less than the reference angle variation when the value of DOP outputted by the GPS receiver (110), the inclination detection signal outputted by the sensor unit (130) and travel angle variation detection signal are inputted, and to repeatedly implement the operation of counting the number of vehicle speed pulse signals.

Under these circumstances, if the value of DOP is equal to or greater than the threshold before the lapse of the predetermined time, or the inclination is equal to or greater than the reference inclination, or the travel angle variation is equal to or greater than the reference angle variation, the tuning start signal generating means (208) does not generate the tuning start signal.

However, the vehicle speed pulse signal tuning means (230) resets the counted time (S318), the travel distance discriminating means (210) resets the travel distance of the mobile object thus discriminated (S320), and the vehicle speed pulse signal counting means (230) resets the counted value of the vehicle speed pulse signal thus counted (S322). Next, flow returns to S302, and the distance of the mobile object is discriminated if the value of DOP is less than the threshold, and the inclination is less than the reference inclination, and if the travel angle variation is less than the reference angle variation. Then operation of counting the number of vehicle speed pulse signals is repeatedly conducted.

Furthermore, if the tuning start signal generating means (208) keeps generating the tuning start signals for an established period of time, the vehicle speed pulse coefficient tuning means (230) finishes the counting of the established period of time. The travel distance of the mobile object discriminated by the travel distance discriminating means (210) during the established period of time and the number of vehicle speed pulse signals counted by the vehicle speed pulse signal counting means (220) are inputted (S324), and the vehicle speed pulse coefficient value is calculated (S316).

When the vehicle speed pulse coefficient value is calculated, the vehicle speed pulse coefficient value under storage is tuned by the vehicle speed pulse coefficient value thus calculated and its calculation is stored (S326). Thereafter, the vehicle speed pulse coefficient value thus tuned is used to calculate the travel distance and the travel speed of the mobile object.

Although the present invention has been illustrated and described in connection with the preferred embodiment, it will be readily understood by those skilled in the art that various adaptations and changes can be made thereto without departing from the spirit and scope of the present invention defined by the appended claims.

As apparent from the foregoing, there is an advantage in the self-tuning apparatus of vehicle speed pulse coefficient and a method thereof thus described according to the present invention in that a vehicle speed pulse coefficient value for converting to a travel distance of a mobile object a vehicle speed signal generated in response to the traveling of a mobile object is tuned when there occur environment changes in which the mobile object travels or there are any instructions from a user, such that the vehicle speed pulse coefficient value can be flexibly tuned in response to the traveling of the mobile object to thereby enable to precisely calculate the travel distance and travel speed of the mobile object.

What is claimed is:

1. A self-tuning method for tuning a vehicle speed pulse coefficient, the method comprising:

determining whether a tuning condition is satisfied;

determining a movement distance of a vehicle if the tuning condition has been satisfied, and counting a number of vehicle speed pulse signals produced in proportion to the movement distance of the vehicle;

calculating the vehicle speed pulse coefficient value according to the movement distance of the vehicle and the counted number of the vehicle speed pulse signals; and tuning a pre-established vehicle speed pulse coefficient value by the calculated vehicle speed pulse coefficient value, wherein the vehicle speed pulse coefficient is tuned in response to road environments in which the vehicle travels and a current state of the vehicle.

2. The method as defined in claim 1, wherein tuning the pre-established vehicle speed pulse coefficient value is performed in response to a tuning instruction regarding the vehicle speed pulse coefficient.

3. The method as defined in claim 2, wherein the tuning instruction is generated by one of manipulation of an instruction input unit by a user, changes in speed of the vehicle that are equal to or greater than a predetermined speed, humidity of a road on which the vehicle travels being equal to or greater than a predetermined humidity, and changes in a kind of a road on which the vehicle travels.

4. The method as defined in claim 1, wherein the tuning condition is satisfied when a value of DOP (Dilution of Precision) output by a GPS (Global Positioning System) receiver is less than a threshold, horizontal and vertical inclinations of a road on which the vehicle travels are less than a reference inclination, or a travel angle variation of the vehicle is less than a reference angle variation.

5. The method as defined in claim 1, wherein the movement distance of the vehicle is determined according to a location coordinate.

6. The method as defined in claim 1, wherein determining the movement distance of the vehicle comprises establishing a location coordinate as a reference location at an initial stage at which satisfaction of the tuning condition is determined, and determining a distance from the established reference location to a new location coordinate output by the GPS receiver as the movement distance of the vehicle.

7. The method as defined in claim 1, wherein the vehicle speed pulse coefficient value is calculated according to the following equation:

$$Vc = D/N,$$

where $Vc$ is the calculated vehicle speed pulse coefficient value, $D$ is the determined movement distance of the vehicle and $N$ is the counted number of vehicle speed pulse signals.

8. The method as defined in claim 1, wherein:

the road environments comprise friction between vehicle wheels and roads, and an abraded state of the vehicle wheels; and the current state of the vehicle comprises a traveling speed of the vehicle.

* * * * *